March 8, 1938.  J. E. HAMMERS ET AL  2,110,222
AUTOMOBILE COOLER
Filed June 4, 1934
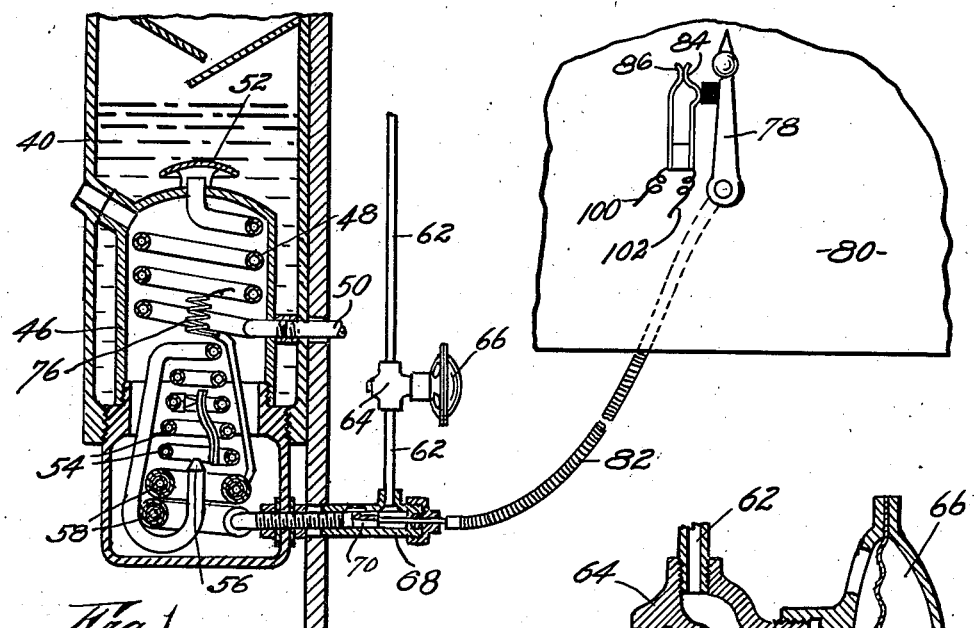
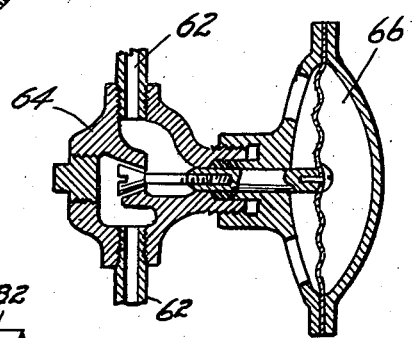
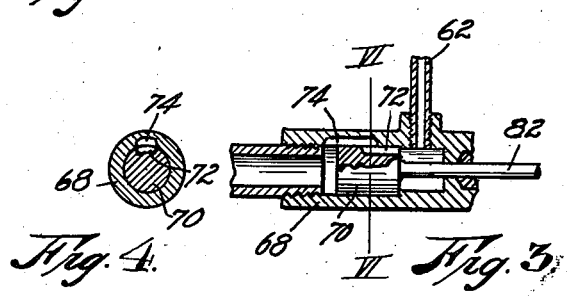
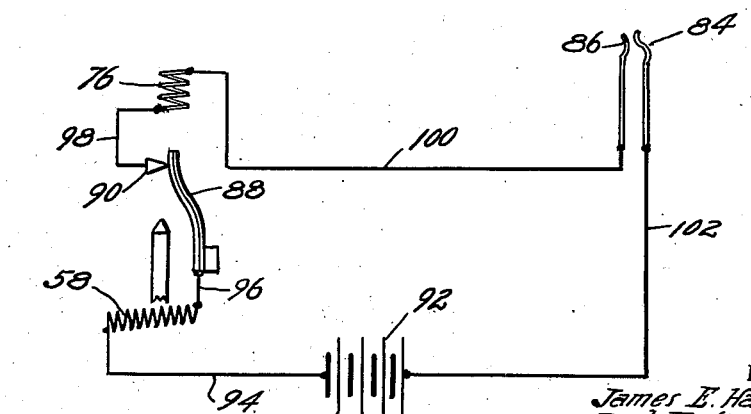
INVENTORS,
James E. Hammers,
Burt F. Hammers,
BY Ezra C. Buehler
Hovey & Hamilton
ATTORNEYS.

Patented Mar. 8, 1938

2,110,222

UNITED STATES PATENT OFFICE 2,110,222

AUTOMOBILE COOLER

James E. Hammers, Burt F. Hammers, and Ezra C. Buehler, Lawrence, Kans., assignors of one-fourth to Ellen S. Bates and Frank E. Bates, Topeka, Kans.

Application June 4, 1934, Serial No. 728,882

6 Claims. (Cl. 158—53)

This invention relates to automobile coolers and has for its primary object, the provision of a novel burner for cooling apparatus used for conditioning the normally closed compartment of an automotive vehicle, whether it be for the purpose of refrigerating said compartment or for conditioning the air therein so that the same will be rendered comfortable for the passengers occupying the same.

Another important object of this invention is the provision of automobile cooling apparatus, having as a part thereof, a generator which includes heating means that employs part of the fuel from the fuel supply system for the motor, the supply of which is both manually and automatically controlled by means within the compartment of the automobile.

A further object of this invention is to provide cooling apparatus for automobiles which has as a part thereof, a unique generator comprising parts which employ both electrical energy and a part of the fuel supply for the automobile motor, such employment being through the medium of specially formed and novel valve and switch elements, to the end that operation of the entire cooling apparatus is rendered easy to start and stop and is made automatic between these times and during the continued operation of the apparatus.

With the foregoing general objects in view and with minor objects in mind that will be made clear during the course of the following specification, one form of the invention will be described by reference to the accompanying drawing, wherein:

Fig. 1 is a partially diagrammatical, fragmentary view through the lower portion of the generator of an automobile cooling apparatus and showing its connection with a manual control located on the instrument board.

Fig. 2 is an enlarged, diagrammatical, sectional view through the thermostatically controlled valve which is actuated by compartment temperature to control the supply of fuel.

Fig. 3 is a central section through the manually operated valve supplying fuel.

Fig. 4 is a cross section through the same, taken on line VI—VI of Fig. 5, and

Fig. 5 is a wiring diagram showing the electrical connections and system employed in this refrigerating apparatus.

The lower part of a cooling apparatus generator 40 is shown in detail in Fig. 1 and has a heating means that utilizes gasoline or the same fuel that is used by the motor which drives the automobile.

The upper part of generator 40 has a chamber formed therein, within which is disposed a series of downwardly inclined baffle plates to direct the condensate back to the lower part of generator 40, wherein is disposed the novel heating means. This heating means 46 is used to heat coils 48 which are in connection with the lower part of an evaporator through the medium of a conduit 50. The open end of coiled conduit 50 is directed against the underside and spaced from the cap 52 which is normally submerged in the water or other absorbing agent within generator 40.

Burner 46 comprises a coil 54 which terminates in an upwardly directed nozzle 56, from which the gasified fuel is projected after passing through said coils 54. A portion of coils 54 is surrounded by heating coils 58 which are removed from the end of pipe 50 forming nozzle 56 a sufficient distance so that generating a gas will be insured prior to the liquid fuel reaching nozzle 56. This coil 54 receives its fuel from a source of fuel supply for nozzle 56 through a conduit 62, within which is interposed a thermostatically controlled valve 64. This valve 64 is always partially open and when a change of temperature takes place within the compartment being conditioned, valve 64 is further opened or partially closed, as the case might be. The valve stem of valve 64 is reciprocated as the temperature within said compartment is changed. This action takes place because of the increase or decrease in volume of the gas within thermostat 66 which acts upon the diaphragm in connection with the valve stem as shown in Fig. 2. Such thermostats are of the commercial type and well known in the art.

It is notable that this thermostat 66 should be positioned within the compartment being conditioned by the cooling apparatus of which the burner, shown in Fig. 1, is a part. If the temperature in the compartment increases, thermostat 66 will act to open valve 64 to cause a greater amount of fuel to reach burner 66 thereby to speed up the flow of refrigerant through the cooling apparatus for the purpose of lowering the temperature in the compartment to the desired degree. When the temperature is lowered thermostat 66 will serve to close valve 64. Thus valve 64 will be opened and closed to speed or retard the action of the cooling system as the temperature in the compartment fluctuates toward and from a predetermined set level.

A manually controlled valve 68 is likewise interposed in conduit 62 and its rotatable piston 70, having a longitudinal notch 72 formed in the wall thereof, either entirely opens or entirely closes valve 68. When the piston 70 is in the position shown in Fig. 3, notch 72 communicates with groove 74 formed along the inner face of the housing of valve 68. When this last mentioned valve 68 is opened, there should be electrical energy supplied to both coils 58 and ignition coils 76, which are above and in alignment with nozzle 56 so that when the same is heated to incandescence the gas will be ignited. When the gas generated by heat from coils 58, is ignited by coils 76 and the flame heats by-metallic strip 88 to a certain degree, the circuit is broken and the heat of coil 48 is derived entirely from the gas flame.

The means for operating valve 68 is a manually controlled handle 78 disposed on the instrument board 80 of the automobile. A flexible shaft 82 joins handle 78 and valve 68 and when handle 78 is moved to open valve 68, it will close contact points 84 and 86 so as to complete the circuit which heats coils 58 and 76. A thermostatic switch comprising the bi-metallic point 88 and stationary point 90 is disposed within burner 46 so that heat therein will move this bi-metallic point 88 to and from the switch closing position.

As illustrated in Fig. 5, this switch comprising points 88 and 90 is in the circuit with points 84 and 86 and even when handle 78 has moved to close these last two points, the circuit is opened when a certain amount of heat is generated in burner 46. Thus the burner is automatic with respect to self-generation and valve 64 automatically supplies more or less fuel as needed to speed or retard refrigerating action.

The diagrammatical showing of the electrical system employed is shown in Fig. 5. This diagram indicates the manner in which battery 92 of the automobile supplies electrical energy to coils. The circuit may be traced as follows: Battery 92, through wire 94 to coil 58, wire 96 to point 88, point 90, wire 98, ignition coil 76, wire 100, and thence through closed contact points 86 and 84 to wire 102 to the point of beginning or the other side of battery 92.

Having thus described the invention, what is claimed as new and desired to be secured by Letters Patent is:

1. In an automobile cooling apparatus, a burner comprising a coiled conduit having an outlet nozzle; an electrical ignition coil adjacent to the said outlet nozzle; a thermostatic switch in circuit with the said coil and operable to the open position by heat of a flame at the outlet nozzle; a manually controlled switch in the circuit; a pipe in connection with the coiled conduit to supply fuel thereto; a valve in the pipe; a source of electrical energy in connection with the circuit for heating the said coil; and a manually operable lever movable to simultaneously control the opening and closing of both the last mentioned switch and manually operable valve, said coiled pipe having an electric heating element wound around a portion thereof in circuit with the heating coil and thermostatic switch whereby to heat the fuel passing through said coiled pipe when the circuit is closed by both the thermostatic and manually controlled switches to heat the ignition coil.

2. In an automobile cooling apparatus, a burner comprising a coiled conduit having an outlet nozzle; an electrical ignition coil adjacent to the said outlet nozzle; a thermostatic switch in circuit with the said coil and operable to the open position by heat of a flame at the outlet nozzle; a manually controlled switch in the circuit; a pipe in connection with the coiled conduit to supply fuel thereto; a valve in the pipe; a source of electrical energy in connection with the circuit for heating the said coil; and a manually operable lever movable to simultaneously control the opening and closing of both the last mentioned switch and manually operable valve, said coiled pipe having an electric heating element wound around a portion thereof in circuit with the heating coil and thermostatic switch whereby to heat the fuel passing through said coiled pipe when the circuit is closed by both the thermostatic and manually controlled switches to heat the ignition coil, said nozzle being circumscribed by the coiled conduit and disposed to direct fuel toward said ignition coil.

3. In an automobile cooling apparatus, a burner comprising a coiled conduit having an outlet nozzle; an electrical ignition coil adjacent to the said outlet nozzle; a thermostatic switch in circuit with the said coil and operable to the open position by heat of a flame at the outlet nozzle; a manually controlled switch in the circuit; a pipe in connection with the coiled conduit to supply fuel thereto; a valve in the pipe; a source of electrical energy in connection with the circuit for heating the said coil; and a manually operable lever movable to simultaneously control the opening and closing of both the last mentioned switch and manually operable valve, said coiled pipe having an electric heating element in circuit with the heating coil and thermostatic switch whereby to heat the fuel passing through said coiled pipe when the circuit is closed by both the thermostatic and manually controlled switches to heat the ignition coil, said nozzle being circumscribed by the coiled conduit and disposed to direct fuel toward said ignition coil, said thermostatic switch being between said nozzle and ignition coil in the path of travel of the flame extending from the said nozzle.

4. In an automobile cooling apparatus, a burner provided with a combustion chamber; a nozzle in the chamber; a heating element in the chamber disposed in the path of travel of fluid passing from the nozzle; a source of fuel supply for the nozzle; a source of electrical current for the element; common means for simultaneously interconnecting the nozzle and said heating element with the source of fuel supply and source of electrical current respectively; and a valve for increasing and decreasing the flow of fuel to the nozzle independently of and after the said common means is in operative position, said valve having a controlling thermostat operable by the change in temperature within the automobile.

5. In an automobile cooling apparatus, a burner comprising a spirally coiled conduit having an outlet nozzle at one end of the conduit disposed within the coil intermediate the ends thereof; an electrical ignition coil adjacent to the said outlet nozzle and in the path of travel of fluid issuing therefrom; a thermostatic switch between the said nozzle and the ignition coil; a manually controlled switch; a circuit connecting the ignition coil, thermostatic switch and manually controlled switch with a source of current; a pipe connecting the spirally coiled conduit with a source of fuel supply; a valve in the pipe to open and close the same; and a control lever operably connected with the said manually controlled switch and said valve to simultaneously close the switch as the valve is opened and to simultaneously open the switch when the valve is closed, said thermostatic switch being movable to the open position to break the circuit after the manually controlled switch is closed and after the heat generated by the burner has acted upon the thermostat of said switch.

6. In an automobile cooling apparatus, a burner comprising a spirally coiled conduit having an outlet nozzle at one end of the conduit disposed within the coil intermediate the ends thereof; an electrical ignition coil adjacent to the said outlet nozzle and in the path of travel of fluid issuing therefrom; a thermostatic switch between the said nozzle and the ignition coil; a manually controlled switch; a circuit connecting the ignition coil, thermostatic switch and manually controlled switch with a source of current; a pipe connecting the spirally coiled conduit with a source of fuel supply; a valve in the pipe to open and close the same; a heating element wound around the said spirally coiled conduit along a short length thereof adjacent to the point of connection between the said pipe and the conduit; and a control lever operably connected with the said manually controlled switch and said valve to simultaneously close the switch as the valve is opened and to simultaneously open the switch when the valve is closed, said thermostatic switch being movable to the open position to break the circuit after the manually controlled switch is closed and after the heat generated by the burner has acted upon the thermostat of said switch, the said heating element being in a closed circuit to generate heat from the time said manually controlled switch is closed until the thermostatic switch is opened.

JAMES E. HAMMERS.
BURT F. HAMMERS.
EZRA C. BUEHLER.